US009910797B2

(12) United States Patent
Simionescu et al.

(10) Patent No.: US 9,910,797 B2
(45) Date of Patent: Mar. 6, 2018

(54) SPACE EFFICIENT FORMATS FOR SCATTER GATHER LISTS

(71) Applicant: Avago Technologies General IP (Singapore) Pte. Ltd., Singapore (SG)

(72) Inventors: Horia Cristian Simionescu, Milpitas, CA (US); Timothy E. Hoglund, Colorado Springs, CO (US); Sridhar Rao Veerla, Bangalore (IN); Panthini Pandit, Bangalore (IN); Gowrisankar Radhakrishnan, Colorado Springs, CO (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 161 days.

(21) Appl. No.: 14/874,945

(22) Filed: Oct. 5, 2015

(65) Prior Publication Data

US 2017/0097908 A1 Apr. 6, 2017

(51) Int. Cl.
*G06F 13/36* (2006.01)
*G06F 13/28* (2006.01)
*G06F 13/16* (2006.01)
*G06F 12/0804* (2016.01)

(52) U.S. Cl.
CPC .......... *G06F 13/28* (2013.01); *G06F 13/1668* (2013.01); *G06F 12/0804* (2013.01)

(58) Field of Classification Search
CPC ... G06F 13/28; G06F 13/1668; G06F 12/0804
See application file for complete search history.

(56) References Cited

U.S. PATENT DOCUMENTS

| | | | | |
|---|---|---|---|---|
| 6,105,075 A * | 8/2000 | Ghaffari | ............... | G06F 9/3879 710/22 |
| 6,810,448 B1 * | 10/2004 | Johnson | .................. | G06F 13/28 709/216 |
| 6,912,687 B1 * | 6/2005 | Gates | ................. | G06F 11/1076 714/6.2 |
| 7,032,228 B1 * | 4/2006 | McGillis | .............. | G06F 3/0607 709/217 |
| 7,062,501 B1 * | 6/2006 | Young | .................. | G06F 13/385 |

(Continued)

OTHER PUBLICATIONS

"An NVM Express Tutorial" by Kevin Marks, Dell, Inc. Flash Memory Summit 2013 at Santa Clara, CA.*

(Continued)

*Primary Examiner* — Jing-Yih Shyu
(74) *Attorney, Agent, or Firm* — Sheridan Ross P.C.

(57) ABSTRACT

Methods and structure for formatting and processing Scatter Gather Lists (SGLs). One exemplary embodiment is a storage controller that includes a cache memory storing data for a logical volume, and a control unit. The control unit is able to service an Input/Output (I/O) request based on a Scatter Gather List (SGL) that refers to the cache memory, the SGL comprising multiple entries that each include a flag field and an identifier (ID) field. The entries are assigned to categories that are each associated with a different set of stored processing instructions. The control unit is able to identify a category for an entry based on a combination of both flag field and ID field for the entry, and the control unit is able to process the entry using the set of instructions associated with the identified category.

20 Claims, 7 Drawing Sheets

(56) References Cited

U.S. PATENT DOCUMENTS

| | | | | |
|---|---|---|---|---|
| 7,471,645 | B2 * | 12/2008 | Torres | H04B 7/18595 370/256 |
| 8,176,252 | B1 * | 5/2012 | Alexander | G06F 13/28 710/22 |
| 8,271,700 | B1 * | 9/2012 | Annem | G06F 13/28 710/22 |
| 8,478,723 | B2 * | 7/2013 | Rousseau | G06F 12/0246 707/633 |
| 8,495,301 | B1 * | 7/2013 | Alexander | G06F 13/28 710/22 |
| 8,635,431 | B2 * | 1/2014 | Citron | G06F 9/30043 711/118 |
| 8,775,718 | B2 * | 7/2014 | Kanevsky | G06F 3/061 370/389 |
| 8,806,115 | B1 | 8/2014 | Patel et al. | |
| 2004/0073622 | A1 * | 4/2004 | McDaniel | G06F 13/28 709/212 |
| 2014/0129664 | A1 * | 5/2014 | McDaniel | G06F 15/167 709/212 |
| 2014/0215103 | A1 * | 7/2014 | Cohen | G06F 13/28 710/23 |
| 2014/0317333 | A1 * | 10/2014 | Dorst | G06F 13/28 710/308 |
| 2016/0062669 | A1 * | 3/2016 | Chu | G06F 3/0611 711/103 |

OTHER PUBLICATIONS

"Enterprise NVMHCI Enabling Enterprise Class PCIe SSDs with Unmatched Performance" by Amber Huffman and Peter Onufryk, Aug. 2010.*

"Linux Storage and Virtualization" by Christoph Hellwig, 2010.*

"Research: Scatter/Gather" by Marti A. Hearst, Professor University of California, Berkeley, Jun. 13, 2010, downloaded from http://people.ischool.berkeley.edu/~hearst/research/scattergather.html.*

"The chained scatterlist API" by Jonathan Corbet, Oct. 29, 2007, downloaded from https://lwn.net/Articles/256368/.*

Horia Simionescu, Data Shovel/Killer Bee Lite (PPT2), LSI, Nov. 2013.

Horia Simionescu, Data Shovel/Killer Bee Lite, LSI, Nov. 2013.

Killer Bee Lite—Code, LSI, Nov. 2013.

Shailendra Aulakh et al., Killer Bee Light Architecture Specification, Avago Technologies, pp. 1-149, Jul. 18, 2014.

Shailendra Aulakh et al., Killer Bee Light Architecture Specification, Avago Technologies, pp. 150-251, Jul. 18, 2014.

Xubin He et al., On Design and Implementation of a Large Virtual NVRAM Cache for Software RAID, Department of Electrical and Computing Engineering, University of Rhode Island, Nov. 20, 2001.

* cited by examiner

SPACE EFFICIENT FORMATS FOR SCATTER GATHER LISTS

FIELD

The invention relates generally to data storage technology, and more specifically to Scatter Gather Lists (SGLs).

BACKGROUND

Computing devices such as Redundant Array of Independent Disks (RAID) storage controllers utilize SGLs to enhance the speed at which Input/Output (I/O) requests from a host are processed. By processing an incoming I/O request based on an SGL, the transfer of data to or from the host (e.g., a Direct Memory Access (DMA) data transfer) can be substantially accelerated. This is because an SGL eliminates the processing overhead that would be involved in setting up and tearing down multiple smaller transfers of data. While SGLs are beneficial for I/O processing, they also take up substantial amounts space in active memory (e.g., Random Access Memory (RAM)), which means that systems using large numbers of SGLs are expensive to implement owing to the need for larger memory chips.

BRIEF DESCRIPTION OF THE DRAWINGS

Some embodiments of the present invention are now described, by way of example only, and with reference to the accompanying figures. The same reference number represents the same element or the same type of element on all figures.

DETAILED DESCRIPTION

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Systems and methods herein provide for SGLs that utilize a custom format which reduces their overall size. This in turn increases the speed at which SGLs are processed, as well as also increasing the number of SGLs that can be stored in memory. For example, in a custom format, the entries of an SGL can each include an identifier field and a flag field. The combination of values for identifier field and flag field for each entry defines a category of processing to apply to the entry. Thus, the nature of operations performed by the storage controller upon the entry can vary, and without the need for an independent field that assigns the entry to a category. Hence, the overall amount of space taken up by the entry is beneficially reduced.

Figure 1:
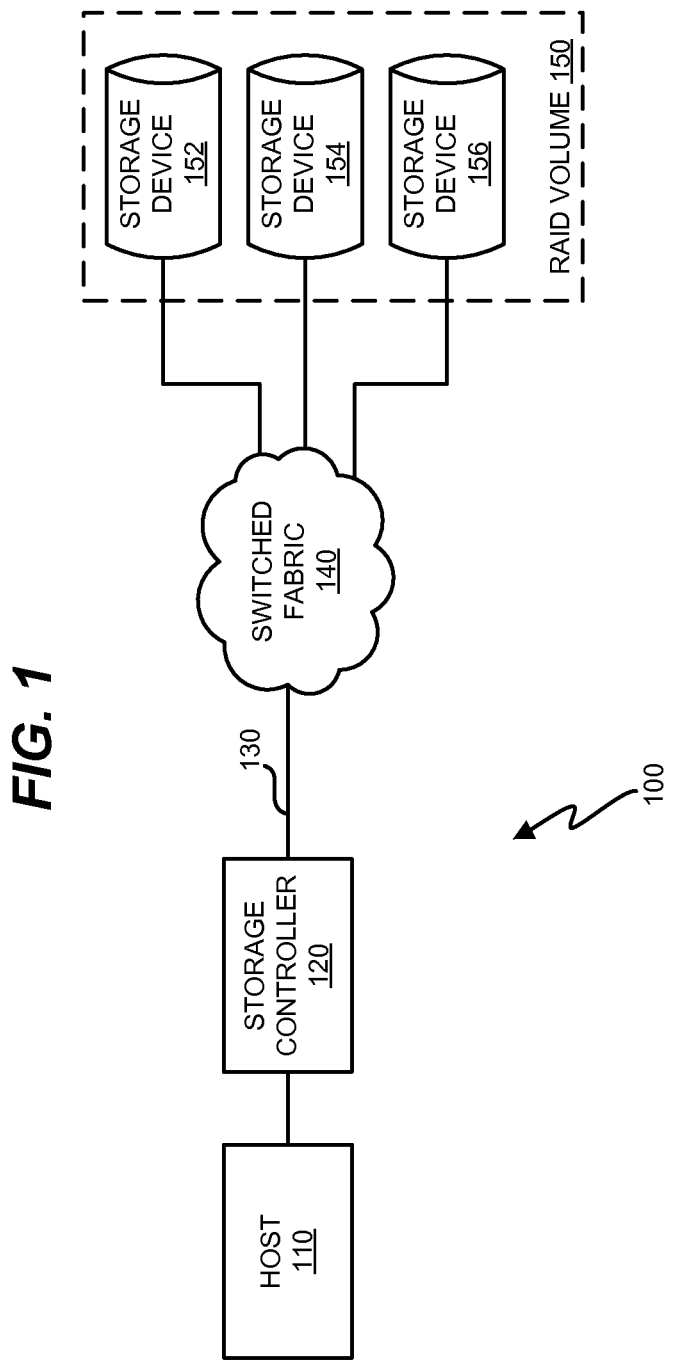
FIG. 1 is a block diagram of an exemplary storage system.

FIG. 1 is a block diagram of an exemplary storage system 100. Storage system 100 stores and retrieves data on behalf of a host 110 in order to facilitate processing operations. In this embodiment, storage system 100 comprises storage controller 120, communication channel 130, switched fabric 140, and storage devices 152-156, which implement Redundant Array of Independent Disks (RAID) volume 150. Storage system 100 provides a benefit over prior systems, because storage controller 120 performs caching techniques that utilize reduced-size SGLs. This in turn increases the speed at which host Input/Output (I/O) requests are processed by storage controller 120.

Host 110 comprises any system capable of performing processing operations upon stored data. Host 110 is communicatively coupled with storage controller 120 via, for example, a Peripheral Component Interconnect Express (PCIe) interface, and provides I/O requests to storage controller 120. Host I/O requests include requests to acquire data from RAID volume 150, as well as requests to modify written data at RAID volume 150. Based on received host requests, storage controller 120 generates and transmits commands to storage devices 152-156 via communication channel 130 and switched fabric 140.

Communication channel 130 comprises, for example, a channel compliant with protocols for SAS, Fibre Channel, Ethernet, etc. Switched fabric 140 comprises any combination of communication channels operable to forward/route communications for storage system 100, for example, according to protocols for one or more of Small Computer System Interface (SCSI), Serial Attached SCSI (SAS), Fibre Channel, Ethernet, Internet SCSI (ISCSI), etc. In one embodiment, switched fabric 140 comprises a combination of SAS expanders that link to one or more targets.

Storage device 152-156 receive commands via switched fabric 140 for retrieving and/or modifying stored data. Storage devices 152-156 implement the persistent storage capacity of storage system 100, and are capable of writing and/or reading data in a computer readable format. Storage devices 152-156 implement storage space for one or more logical volumes such as RAID volume 150. A logical volume comprises allocated storage space and data available at storage system 100. A logical volume can be implemented on any number of storage devices 152-156 as a matter of design choice. Furthermore, the storage devices need not be dedicated to only one logical volume, but can also store data for a number of other logical volumes. Storage devices 152-156 can comprise magnetic hard disks, solid state drives, optical media, etc. compliant with protocols for SAS, Serial Advanced Technology Attachment (SATA), Fibre Channel, etc.

Figure 2:
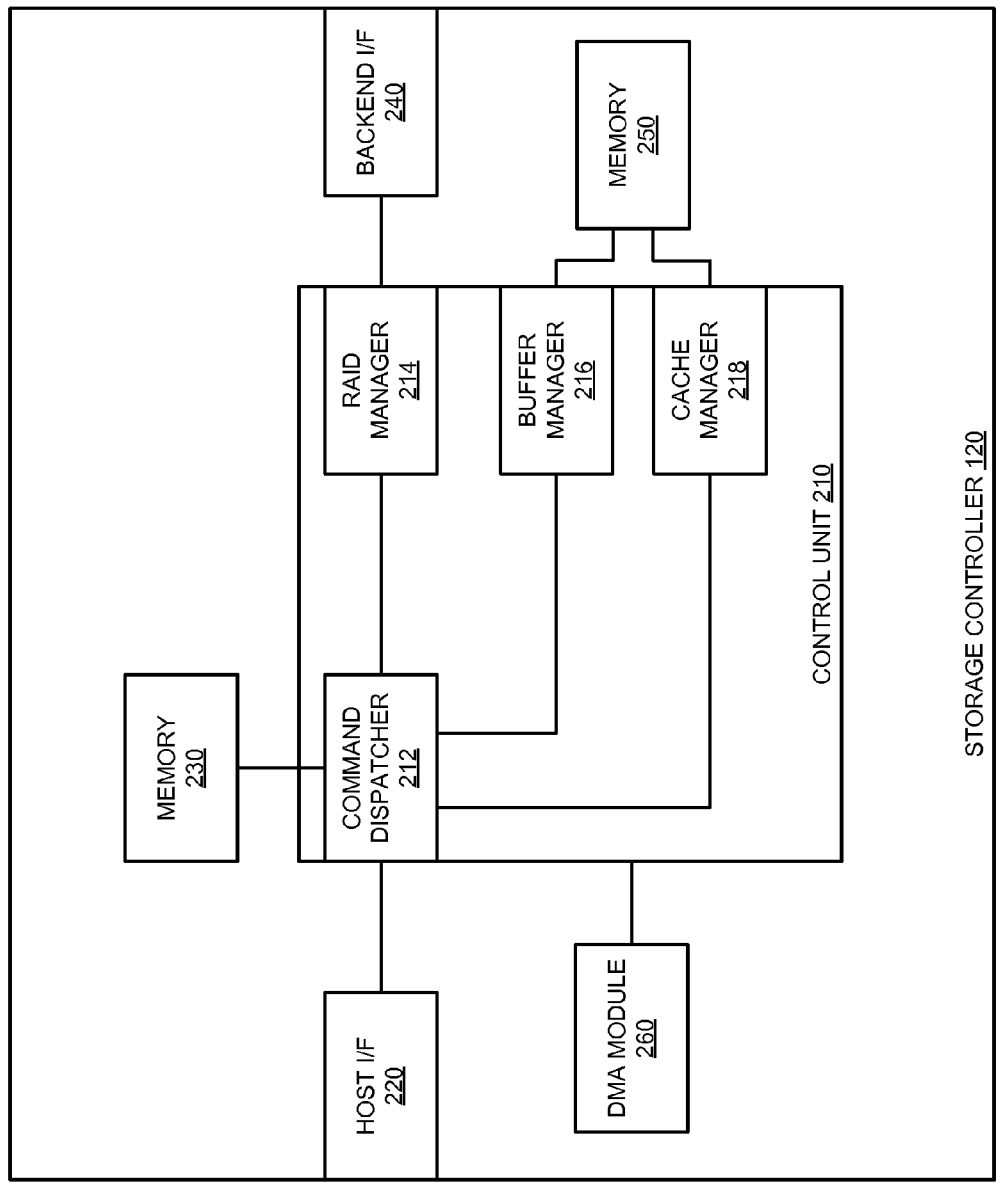
FIG. 2 is a block diagram of an exemplary storage controller.

Further details of storage controller 120 are provided in FIG. 2, which is a block diagram 200 of storage controller 120. According to FIG. 2, storage controller 120 includes control unit 210, which implements a variety of logical elements for managing caching operations. Control unit 210 can be implemented as custom circuitry, a processor executing programmed instructions stored in program memory, or some combination thereof. The logical elements of control unit 210 include command dispatcher 212, which receives commands via host interface (I/F) 220 (e.g., a Peripheral Component Interconnect Express (PCIe) interface) for processing, modifies the commands into an internal format, and routes the commands to their appropriate destination. To achieve these goals, command dispatcher 212 may utilize a fast memory 230, such as a Static Random Access Memory (SRAM) which stores tracking information and metadata for host I/O. For example, in one embodiment the SRAM allocates and populates internal I/O frames relating to Logical Memory Identifiers (LMIDs). In a further embodiment the SRAM allocates and downloads Physical Region Page (PRP) lists from host I/O frames. This technique is useful for devices that conform with the Non-Volatile Memory Host Controller Interface Specification (NVMHCI), which are known as NVMe devices.

Command dispatcher 212 sends processed I/O to various other logical elements of control unit 210, depending on whether the I/O is write back in nature, and depending on whether the I/O relates to a write request or a read request. For example, incoming write requests that update data stored in cache memory 250 are sent to buffer manager 216, which allocates buffer segments that store "payload data" for RAID volume 150. As used herein, "payload data" refers to data stored in one or more Logical Block Addresses (LBAs) of RAID volume 150. The write requests are then forwarded to cache manager 218.

Incoming read requests directed to data stored in cache memory 250 are sent to cache manager 218. Cache manager 218 manages and updates cache entries, which are used as an indexing mechanism to correlate buffer segments with strips/stripes of LBA data on RAID volume 150. Based on the cache entries, cache manager 218 generates Scatter Gather Lists (SGLs) to service incoming requests. Cache manager 218 then directs Direct Memory Access (DMA) module 260 based on the SGLs in order to facilitate data transfers between cache memory 250 and host 110. If requested read data is not stored in cache memory 250, cache manager 218 contacts RAID manager 214, which utilizes backend interface (I/F) 240 (e.g., a SAS interface) to acquire and/or update the requested data from persistent storage at storage devices 152-156.

Figure 3:
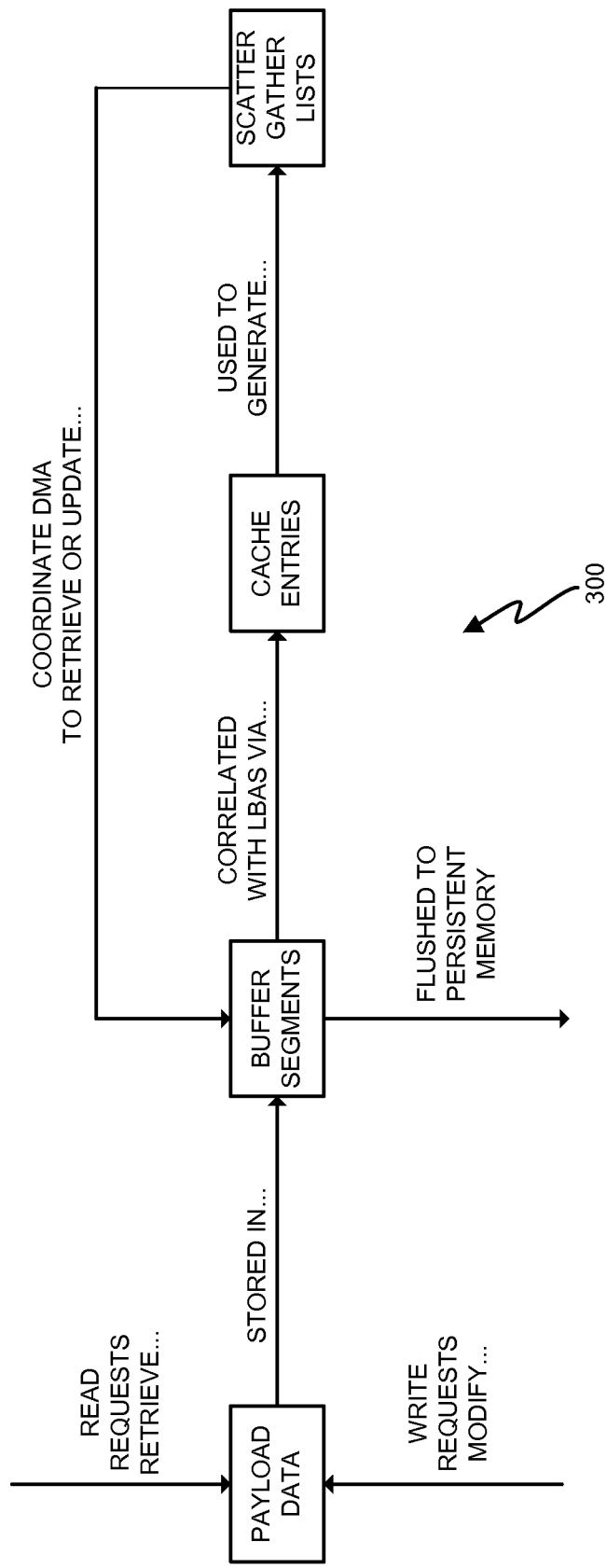
FIG. 3 is a block diagram illustrating relationships between types of data that are used for managing a cache memory.

FIG. 3 illustrates an exemplary relationship diagram 300 for data stored at a storage controller. Specifically, FIG. 3 illustrates relationships between payload data, buffer segments that store payload data, cache entries that correlate buffer segments with LBAs, and SGLs that coordinate DMA transfers of data to and from buffer segments, based on indexing information found in the cache entries. FIG. 3 indicates that payload data for host requests is stored in buffer segments that are allocated in cache memory 250. Data stored in the buffer segments may be flushed to persistent memory (e.g., storage devices 152-156), or maintained in cache memory 250 as desired. For example, when cache memory 250 operates as a Write-Back (WB) cache, buffer segments storing data for incoming write requests are regularly flushed from cache memory 250 to persistent storage. If buffer segments for a write request have already been flushed to persistent memory, then they are selectively discarded from the cache, based on the volume and/or recency of use of the stored data in those buffer segments. Cache entries indicate which LBAs correspond with which buffer segments, and the cache entries are used as the basis for creating Scatter Gather Lists (SGLs). The SGLs in turn are used to coordinate DMA operations to transfer data between the cache memory and the host (i.e., either into cache memory or into host memory via a bus).

The particular arrangement, number, and configuration of components described herein is exemplary and non-limiting. While in operation, storage system 100 manages cache memory 250 as a WB cache in order to quickly process incoming write requests. Storage controller 120 also utilizes data from cache memory 250 to service incoming read requests from host 110.

Figure 4:
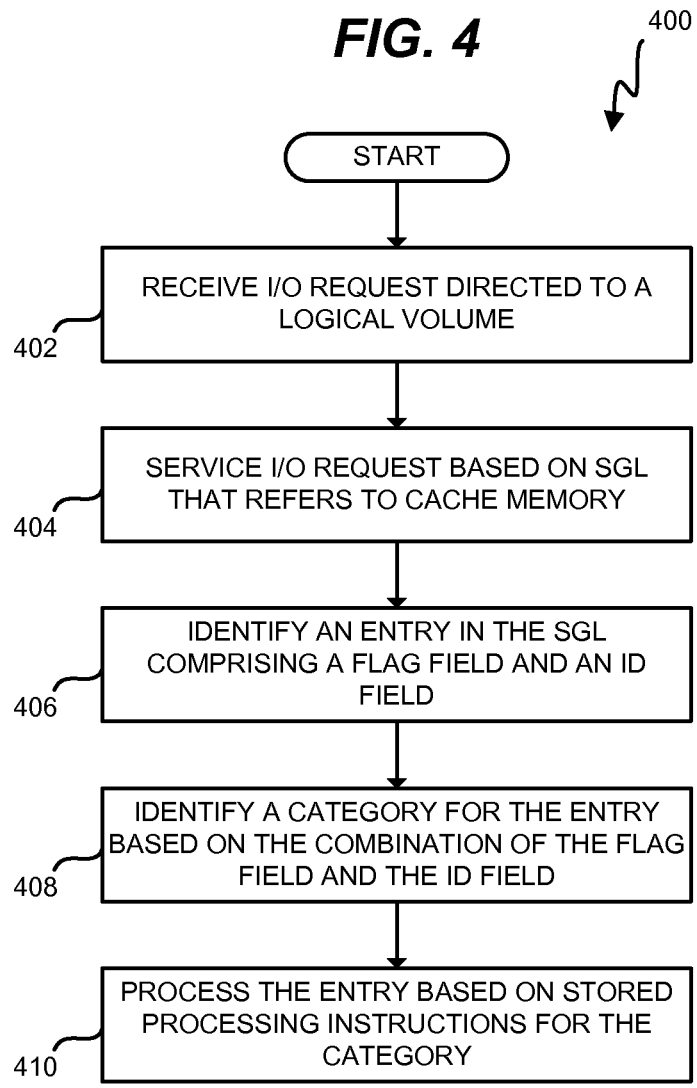
FIG. 4 is a flowchart describing an exemplary method for operating a storage controller to utilize an SGL.

FIG. 4 is a flowchart describing an exemplary method 400 for operating a storage controller to utilize an SGL when servicing a request from host 110. According to FIG. 4, in step 402 command dispatcher 212 receives an I/O request directed to a logical volume managed by storage controller 120. Based on this received I/O request, cache manager 218 generates an SGL based on information stored in the cache entries. If the received request is a write request, cache manager 218 generates the SGL to perform a Direct Memory Access (DMA) transfer of data from host 110 to cache memory 250, and if the received request is a read request, cache manager generates the SGL to perform a DMA transfer of data to the host from cache memory 250. The SGL is internal to storage controller 120 in that it is not transferred to external devices, and in that the SGL utilizes a custom format that is based on the structure of the cache implemented by storage controller 120.

Generating the SGL includes, for example, identifying Logical Block Addresses (LBAs) that have been requested by the host, and translating those LBAs into strip and/or stripe numbers for the logical volume. Based on the strip/stripe numbers requested, cache manager 218 consults cache entries stored in cache memory 250 to determine which buffer segments presently store data for the requested LBAs. Cache manager 218 then populates the SGL with, for example, entries that refer to the locations of the determined buffer segments. In one embodiment, each of the entries consists of a 3 Byte (B) identifier (ID) field and a 1B flag field. The combination of these two fields indicates a category for the entry. In this manner, entries do not require dedicated fields to indicate the type of data that they store.

In step 404, control unit 210 services the I/O request based on the SGL, which refers to cache memory 250 (i.e., either to transfer data into or out of the cache memory, depending on whether the I/O request is a read request or a write request). This involves processing the entries in the SGL to transfer data either to or from cache memory 250. Processing the SGL comprises identifying an entry in the SGL in step 406, and then identifying a category for the entry based on a combination of ID field value and flag field value for the entry in step 408. Specific techniques for distinguishing one category from another are discussed in the examples below.

Each category is handled by control unit 210 according to a different set of processing instructions for control unit 210. Thus, the category for an entry in the SGL defines the type of processing that control unit 210 will perform when reviewing the entry. The processing instructions indicate how to interpret and handle the data stored in an entry of an SGL. Hence, each set of processing instructions is separate and distinct from the data stored in an entry of the SGL. For example, one set of instructions can dictate how to interpret an entry as a reference to one or more buffer segments, while another set of instructions can dictate how to interpret an entry as a reference to another SGL. In short, each category can be associated with a different set of instructions for processing the flag and/or ID field of an entry, such that the exact same ID field (or flag field) for different categories of entry is interpreted differently. The sets of processing instructions may be stored in a processor cache at control unit 210, or may be stored in cache memory 250 as desired.

In step 410, control unit 210 processes the entry based on the stored processing instructions for the category. This step can involve retrieving/loading the relevant processing instructions, and performing operations upon cache memory 250 in response to interpreting the values of the fields for the entry based on those processing instructions. For example, this step can include utilizing DMA operations to transfer specific portions of data either to or from cache memory 250. Details of specific processing operations performed on different types/categories of data are described below in the examples section. Steps 404-410 may repeat until all SGL entries have been processed (e.g., including entries in SGLs that are linked to the first SGL), in order to ensure that all data referred to by the request has been properly transferred. Thus, control unit 210 can process one type of SGL entry to quickly determine the location of relevant buffer segments in memory, while processing another type of SGL entry (e.g., having the exact same size and field format) in an entirely different manner. Furthermore, these techniques save substantial amounts of space because there is no requirement to have a dedicated field within the entry that categorizes the entry.

Even though the steps of method 400 are described with reference to storage control unit 120 of FIG. 1, method 400 can be performed in other storage controllers. The steps of the flowcharts described herein are not all inclusive and can include other steps not shown. The steps described herein can also be performed in an alternative order.

EXAMPLES

In the following examples, additional processes, systems, and methods are described in the context of a specialized format, internal to a storage controller and not distributed outside of the storage controller, for storing and interpreting entries in an SGL. Specifically, FIG. 5 illustrates a format and heuristic for identifying and processing different categories/types of entries in an SGL, while FIG. 6 illustrates interpretation of one or more entries within an SGL in order to retrieve buffer segments from a cache memory.

Figure 5:
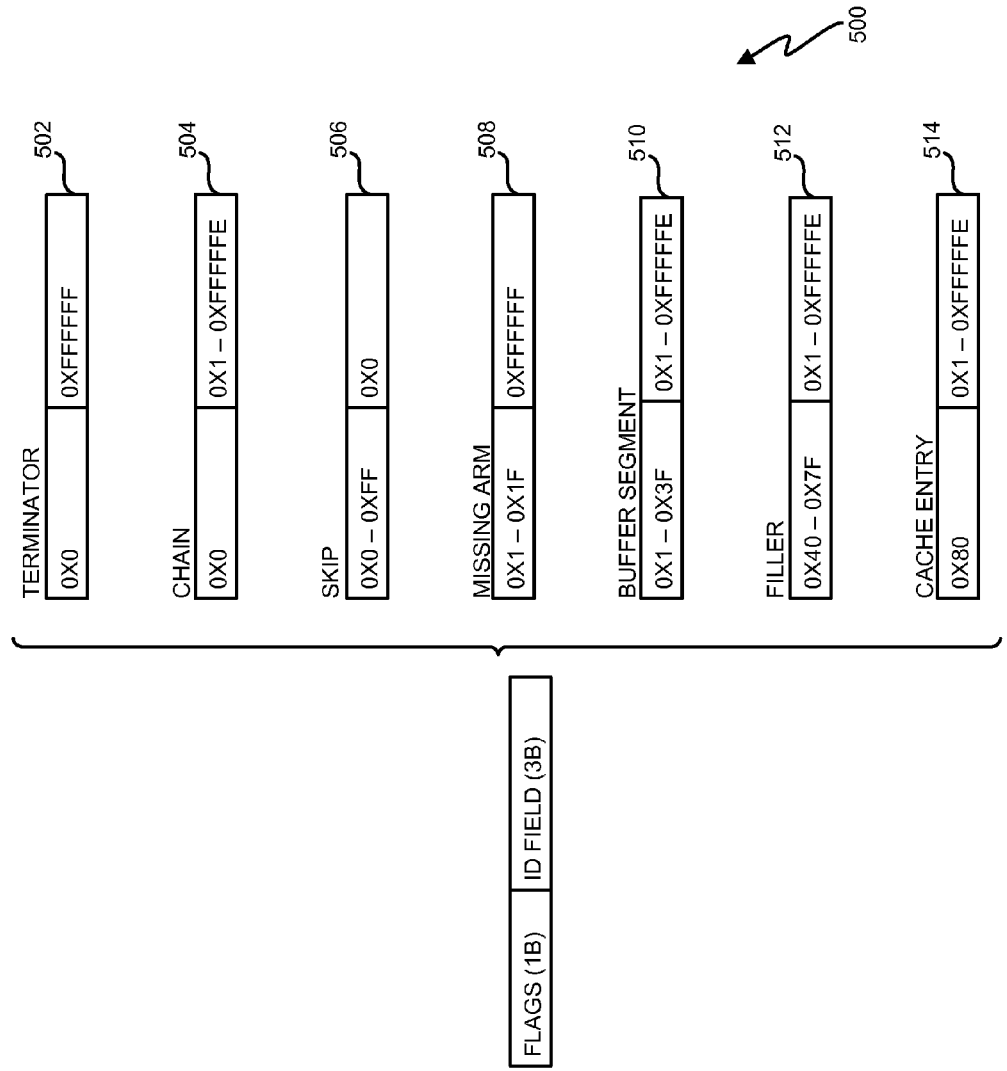
FIG. 5 is a block diagram illustrating an exemplary set of processing categories assigned to entries in an SGL.
Figure 6:
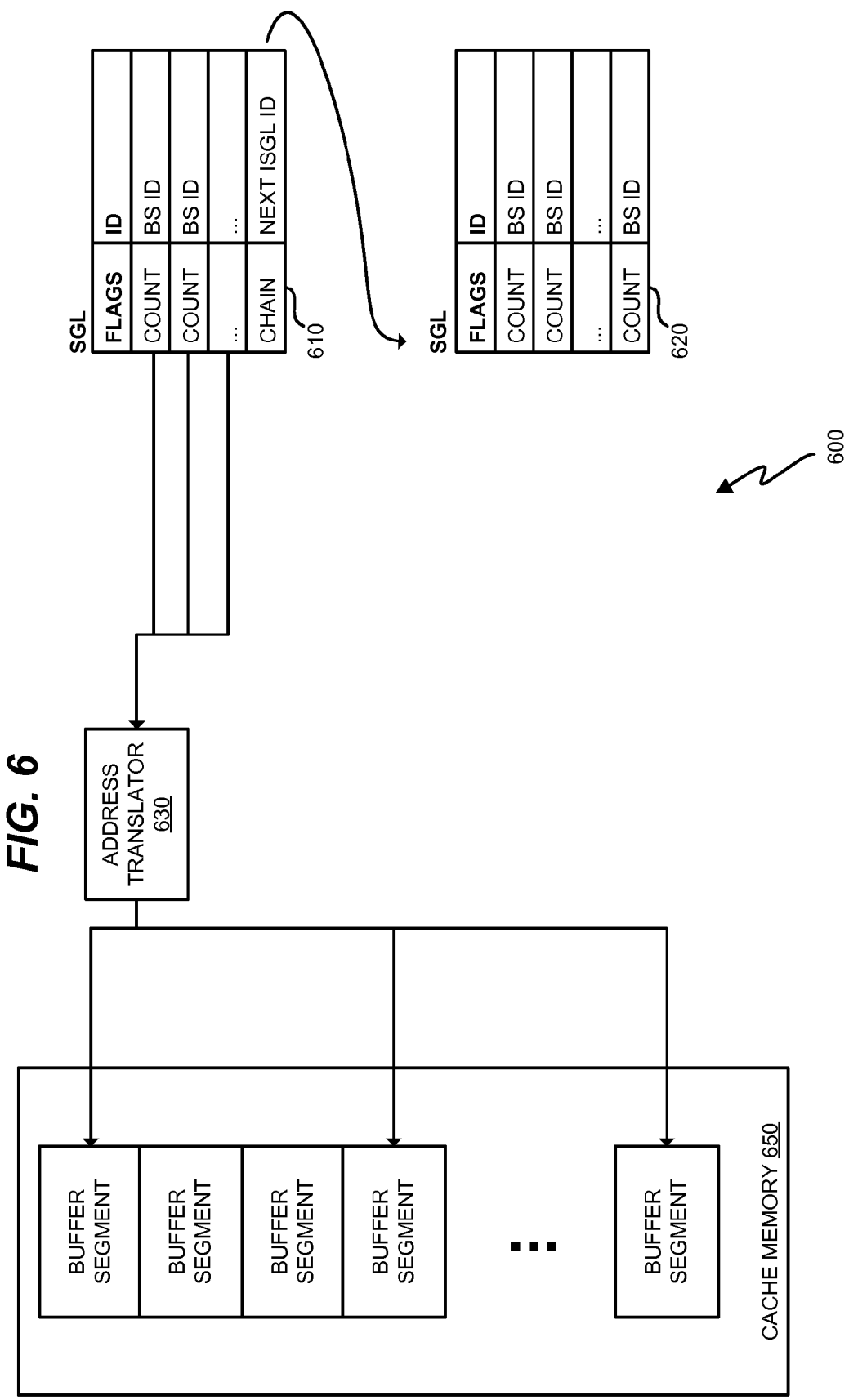
FIG. 6 is a diagram illustrating exemplary processing of an SGL.

FIG. 5 is a block diagram 500 illustrating an exemplary set of processing categories/types assigned to entries in an SGL. In FIG. 5, each entry in an SGL is a fixed length entry comprising a fixed length 1 B flag field and a fixed length 3 B ID field. The categories illustrated in FIG. 5 include the following:

Terminator: a terminator entry (e.g., 502) is the last entry in a single SGL or a chained set of SGLs. The terminator entry indicates that no further processing is necessary, no further SGL entries exist, and that processing of the host request is complete. Terminator entries are distinguished from other entries by having a value of 0x0 in the flag field, and a value of 0XFFFFFF ("INVALID") in the ID field.

Chain: a chain entry (e.g., 504) is the last entry in an SGL, and refers to another SGL that stores further entries for the host request. A chain entry is used when the number of entries in the earlier SGL is insufficient to fully service a request from the host. The ID field of the chain entry refers to another SGL stored in cache memory. Specifically, the 3 B ID field in a chain entry refers to a location of the other SGL in cache memory. For example, a known contiguous range of data in cache memory can be used to store SGLs. The range can have a known start address in cache memory. Thus, when the SGLs are uniformly sized, the 3 B ID field can indicate a number for the SGL from which a location in cache memory can be determined based on an offset. Alternatively, the 3 B ID field can indicate an offset from the start address in the form of a number of bits or bytes from the start location. A chain entry is distinguished from other entries by having a value of 0x0 in the flag field and a value in the ID field ranging from 0x1-0xFFFFFE.

Skip: a skip entry (e.g., 506) indicates a number of blocks of contiguous strip/stripe data to skip when reading retrieving data from persistent storage for a logical volume. Skip entries indicate that these blocks do not store relevant data for the host request. Skip entries are distinguished from other entries by having flag field values ranging from 0x0 to 0xFF, and by having an ID field value of 0x0. The value of the flag field indicates a number of blocks to skip in the logical volume. That is, a number of blocks where data for servicing the request is not available.

Missing arm: a missing arm entry (e.g., 508) is used to indicate whether or not an entire arm of persistent storage for a RAID volume (i.e., a set of disks implementing a semi-independent RAID level for the volume), do not store data for the host request. This type of entry helps to reduce the number and size of skip counts/entries in an SGL, which in turn reduces the amount of parsing required when processing an SGL. A missing arm entry is distinguished from other entries in the SGL by having a flag value ranging from 0x1-0xFF, and by having an ID field value of 0XFFFFFF ("~INVALID").

Buffer segment: a buffer segment entry (e.g., 510) refers to one or more buffer segments in cache memory. A buffer segment entry refers to buffer segments that store data for servicing the request from cache memory. The ID field of a buffer segment entry refers to a starting buffer segment, and the flag field is a count value indicating a number of buffer segments that store data for the request. For write requests, these buffer segments will store incoming data. For read requests, these buffer segments are the source for outgoing data. The reference to the first buffer segment may be interpreted via similar techniques to those discussed above for references to new SGLs in chain entries. When buffer segments are of a fixed length size (e.g., 4 kB), a count value provides sufficient information to determine how much data to read from cache memory following a start address. A buffer segment entry is distinguished from other entries by having a flag field value ranging from 0x1-0x3F, and having an ID field value ranging from 0x1-0xFFFFFE. A buffer segment with a count of zero is disallowed.

Filler: a filler entry (e.g., 512) refers to data maintained in persistent storage that is not relevant to the host request, but that bridges relevant strips/stripes of requested data. This enables a storage controller to coalesce multiple reads from persistent storage (which each may be associated with a substantial delay as a read head on a storage device is moved) into a single aggregate read for contiguous data. A filler entry has a flag field value ranging from 0x40-0X7F, and has an ID field value ranging from 0x1-0xFFFFFE. The count value in the flag field is set such that 0x40 indicates one block of filler, 0x42 indicates two blocks of filler, and so on. The ID field identifies a starting block of filler (e.g., a starting strip/stripe at the volume).

Cache entry: a "cache entry" entry (e.g., 514) in an SGL refers to a cache entry. It indicates that following entries in the SGL are described by the indicated cache entry. A "cache entry" entry in the SGL is distinguished from other entries in the SGL by having a flag value of 0x80, and by having ID field values ranging from 0x1-0xFFFFFE. The ID field references a cache entry, utilizing similar techniques to those described above with regard to chain entries and references to other SGLs.

FIG. 6 is a diagram 600 illustrating exemplary processing of SGLs. According to FIG. 6, entries known as Scatter Gather Entries (SGEs) of SGL 610 are interpreted by a control unit at a storage controller, and are parsed until a chain entry in SGL 610 initiates processing of SGL 620. In this example, each buffer segment stores 4 kB of data, and a portion of cache memory 650, starting from a start address, is dedicated to the storage of buffer segments. SGEs that refer to buffer segments refer to the buffer segments by a value indicating the number of the buffer segment. For example, buffer segment 1 is offset from the start address by 4 kB, and so on. Thus, to interpret a buffer segment entry to retrieve a buffer segment, the control unit applies the following formula via address translator logic 630: Buffer Address=Start Address+(ID Field Value)*(Buffer Size).

Figure 7:
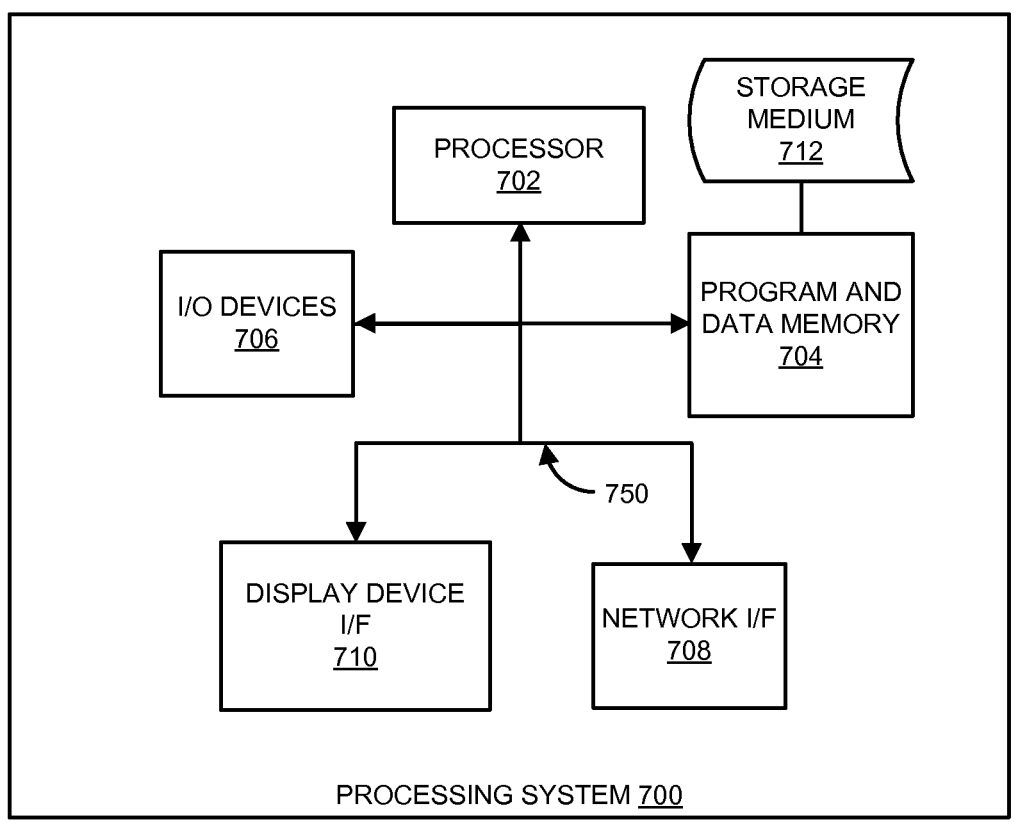
FIG. 7 illustrates an exemplary processing system operable to execute programmed instructions embodied on a computer readable medium.

Embodiments disclosed herein can take the form of software, hardware, firmware, or various combinations thereof. In one particular embodiment, software is used to direct a processing system of storage controller 120 to perform the various operations disclosed herein. FIG. 7 illustrates an exemplary processing system 700 operable to execute a computer readable medium embodying programmed instructions. Processing system 700 is operable to perform the above operations by executing programmed instructions tangibly embodied on computer readable storage medium 712. In this regard, embodiments of the invention can take the form of a computer program accessible via computer readable medium 712 providing program code for use by a computer (e.g., processing system 700) or any other instruction execution system. For the purposes of this description, computer readable storage medium 712 can be anything that can contain or store the program for use by the computer (e.g., processing system 700).

Computer readable storage medium 712 can be an electronic, magnetic, optical, electromagnetic, infrared, or semiconductor device. Examples of computer readable storage medium 712 include a solid state memory, a magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

Processing system 700, being used for storing and/or executing the program code, includes at least one processor 702 coupled to program and data memory 704 through a system bus 750. Program and data memory 704 can include local memory employed during actual execution of the program code, bulk storage, and cache memories that provide temporary storage of at least some program code and/or data in order to reduce the number of times the code and/or data are retrieved from bulk storage during execution.

Input/output or I/O devices 706 (including but not limited to keyboards, displays, pointing devices, etc.) can be coupled either directly or through intervening I/O controllers. Network adapter interfaces 708 can also be integrated with the system to enable processing system 700 to become coupled to other data processing systems or storage devices through intervening private or public networks. Modems, cable modems, IBM Channel attachments, SCSI, Fibre Channel, and Ethernet cards are just a few of the currently available types of network or host interface adapters. Display device interface 710 can be integrated with the system to interface to one or more display devices, such as printing systems and screens for presentation of data generated by processor 702.

What is claimed is:

1. A storage controller comprising:
a cache memory storing data for a logical volume; and
a control unit that services an Input/Output (I/O) request based on a Scatter Gather List (SGL) that refers to the cache memory, the SGL comprising multiple entries that each include a flag field and an identifier (ID) field, wherein
the entries are assigned to categories that are each associated with a different set of stored processing instructions, the control unit is operable to identify a category for an entry based on a combination of both flag field and ID field for the entry, and the control unit is operable to process the entry using the set of processing instructions associated with the identified category,
a first category of entry utilizes the ID field to refer to a portion of the cache memory for request data, and
the control unit identifies the first category of entry based on a combination of a non-zero ID field and a non-zero flag field.

2. The storage controller of claim 1, wherein:
a second category of entry utilizes the ID field to indicate a link to another SGL, and the control unit identifies the second category of entry based on a combination of an non-zero ID field and a flag field set to zero.

3. The storage controller of claim 2, wherein:
a third category of entry indicates that processing for the I/O request has completed, and the control unit identifies the third category of entry based on a combination of an ID field set to zero and a flag field set to zero.

4. The storage controller of claim 3, wherein:
a fourth category of entry indicates a missing Redundant Array of Independent Disks (RAID) arm, and the control unit identifies the fourth category of entry based on a combination of a non-zero ID field and a flag field set to a maximum value.

5. The storage controller of claim 1, wherein:
each ID field has a fixed length of 3 bytes, and each flag field has a fixed length of 1 byte.

6. The storage controller of claim 1, wherein:
the different sets of processing instructions alter how the control unit interprets an ID field and a flag field for an entry.

7. The storage controller of claim 1, wherein the first category of entry comprises at least one of a terminator entry, a chain entry, a skip entry, a missing arm entry, a buffer segment entry, a filler entry, and a cache entry.

8. A method comprising:
receiving an Input/Output (I/O) request that is directed to a logical volume;
servicing the I/O request based on a Scatter Gather List (SGL) that refers to cache memory;
identifying an entry in the SGL, the entry comprising a flag field and an identifier (ID) field;
identifying a category for the entry based on the combination of the flag field and the ID field, wherein each category is associated with a different set of stored processing instructions; and
processing the entry using the set of processing instructions associated with the identified category, wherein a first category of entry utilizes the ID field to refer to a portion of the cache memory for request data; and
identifying the first category of entry based on a combination of a non-zero ID field and a non-zero flag field.

9. The method of claim 8, wherein:
a second category of entry utilizes the ID field to indicate a link to another SGL, and the method further comprises identifying the second category of entry based on a combination of an non-zero ID field and a flag field set to zero.

10. The method of claim 9, wherein:
a third category of entry indicates that processing for the I/O request has completed, and the method further comprises identifying the third category of entry based on a combination of an ID field set to zero and a flag field set to zero.

11. The method of claim 10, wherein:
a fourth category of entry indicates a missing Redundant Array of Independent Disks (RAID) arm, and the method further comprises identifying the fourth category of entry based on a combination of a non-zero ID field and a flag field set to a maximum value.

12. The method of claim 8, wherein:
each ID field has a fixed length of 3 bytes, and each flag field has a fixed length of 1 byte.

13. The method of claim 8, wherein:
the different sets of processing instructions alter how an ID field and a flag field for an entry are interpreted.

14. The method of claim 8, wherein the first category of entry comprises at least one of a terminator entry, a chain entry, a skip entry, a missing arm entry, a buffer segment entry, a filler entry, and a cache entry.

15. A non-transitory computer readable medium embodying programmed instructions which, when executed by a processor, direct the processor to:
receive an Input/Output (I/O) request that is directed to a logical volume;
service the I/O request based on a Scatter Gather List (SGL) that refers to cache memory;
identify an entry in the SGL, the entry comprising a flag field and an identifier (ID) field;
identify a category for the entry based on the combination of the flag field and the ID field, wherein each category is associated with a different set of stored processing instructions;
process the entry using the set of processing instructions associated with the identified category, wherein a first category of entry utilizes the ID field to refer to a portion of the cache memory for request data; and
direct the processor to identify the first category of entry based on a combination of a non-zero ID field and a non-zero flag field.

16. The medium of claim 15, wherein:
a second category of entry utilizes the ID field to indicate a link to another SGL, and the instructions further direct the processor to identify the second category of entry based on a combination of an non-zero ID field and a flag field set to zero.

17. The medium of claim 16, wherein:
a third category of entry indicates that processing for the I/O request has completed, and the instructions further direct the processor to identify the third category of entry based on a combination of an ID field set to zero and a flag field set to zero.

18. The medium of claim 15, wherein:
each ID field has a fixed length of 3 bytes, and each flag field has a fixed length of 1 byte.

19. The medium of claim 15, wherein:
the different sets of processing instructions alter how an ID field and a flag field for an entry are interpreted.

20. The medium of claim 15, wherein the first category of entry comprises at least one of a terminator entry, a chain entry, a skip entry, a missing arm entry, a buffer segment entry, a filler entry, and a cache entry.

* * * * *